United States Patent
Grier et al.

(10) Patent No.: US 7,287,259 B2
(45) Date of Patent: *Oct. 23, 2007

(54) ISOLATING ASSEMBLY VERSIONS FOR BINDING TO APPLICATION PROGRAMS

(75) Inventors: Michael J. Grier, Woodinville, WA (US); RoseMarie FitzSimons, Seattle, WA (US); David D'Souza, Mercer Island, WA (US); Peter Wilson, Kirkland, WA (US); Srivatsan Parthasarathy, Bellevue, WA (US); Sanjay G. Shenoy, Redmond, WA (US); Micheal Dunn, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 584 days.

This patent is subject to a terminal disclaimer.

(21) Appl. No.: 09/842,270

(22) Filed: Apr. 24, 2001

(65) Prior Publication Data

US 2002/0019972 A1    Feb. 14, 2002

Related U.S. Application Data

(60) Provisional application No. 60/199,374, filed on Apr. 24, 2000.

(51) Int. Cl.
    *G06F 9/44* (2006.01)
(52) U.S. Cl. ..................... 719/331; 717/164
(58) Field of Classification Search ........ 717/162–166; 719/331, 332
    See application file for complete search history.

(56) References Cited

U.S. PATENT DOCUMENTS

| 4,809,170 A | 2/1989 | Leblang et al. |
| 5,339,430 A | 8/1994 | Lundin et al. |
| 5,805,899 A | 9/1998 | Evans et al. |
| 5,974,470 A * | 10/1999 | Hammond ............ 719/331 |

(Continued)

OTHER PUBLICATIONS

Finnie, Scot et al., "The Final Beta—Inside Windows 2000 Beta 3", www.PlanetIT.com/docs/PIT19990707S0023, Jul. 1, 1999, pp. 1-8.

(Continued)

*Primary Examiner*—Tuan Dam
*Assistant Examiner*—Michael Yigdall
(74) *Attorney, Agent, or Firm*—Workman Nydegger

(57) ABSTRACT

An infrastructure that allows applications to run with specified versions of dependent assemblies, wherein each assembly may exist and run side-by-side on the system with other versions of the same assembly being used by other applications. An application provides a manifest to specify any desired assembly versions on which it is dependent. Similarly, each assembly may have an assembly manifest that specifies the versions of assemblies on which it is dependent. During an initialization phase, an activation context is created for the application, based on the manifests, to map version independent names to a particular assembly version maintained on the system. While the application is in a running phase, for any globally named object that the application wants created, the activation context is accessed to locate the application's or assembly's manifest-specified version. The manifests and activation context constructed therefrom thus isolate an application from assembly version changes.

39 Claims, 9 Drawing Sheets

U.S. PATENT DOCUMENTS

| | | |
|---|---|---|
| 6,185,734 B1 | 2/2001 | Saboff et al. |
| 6,314,565 B1 | 11/2001 | Kenner et al. |
| 6,332,168 B1 * | 12/2001 | House et al. ............ 719/331 |
| 6,442,753 B1 * | 8/2002 | Gerard et al. ............ 717/170 |
| 6,560,614 B1 | 5/2003 | Barboy et al. |
| 6,658,659 B2 * | 12/2003 | Hiller et al. ............ 717/166 |

OTHER PUBLICATIONS

Grinzo, Lou, "Paranoia is Your Friend", www.winmag.com/library/1997/0601/analy034.htm, Jun. 1997, pp. 1-3.

Richardson, Robert, "Components Battling Components", www.byte.com/art/9711/sec6/art6.htm, Nov. 1997, pp. 1-12.

* cited by examiner

ISOLATING ASSEMBLY VERSIONS FOR BINDING TO APPLICATION PROGRAMS

CROSS-REFERENCE TO RELATED APPLICATIONS

The present application claims priority to U.S. Provisional Patent Application Ser. No. 60/199,374, filed Apr. 24, 2000, and is also related to U.S. patent application entitled "Configurations for Binding Software Assemblies to Applications," Ser. No. 09/842,278, filed concurrently herewith.

FIELD OF THE INVENTION

The present invention is generally directed to computer systems, and more particularly to executable computer code such as application programs that utilize shared assemblies (components).

BACKGROUND OF THE INVENTION

At one time, computer applications were monolithic blocks of executable code and data, although some of their data such as variable settings could be maintained in separate files. This made tasks like moving or replacing the application simple. In contrast, contemporary computer applications and other executable code (such as an operating system component) bind to and make use of shared components, wherein in general a component is a self-contained software entity, offering a set of functions that can be used by a variety of applications. Such components include dynamic link libraries (DLLs) and objects such as OLE (Object Linking and Embedding) components and COM (Component Object Model) components, including ActiveX® controls. In turn, some of these shared components depend on other shared components.

On any given machine, at present there is one version of each of these components shared by applications, such as the most-recently installed version, although some mechanisms are known that replace an installed component only when an available replacement component has a higher version number. The metadata maintained for using these components is generally maintained in the system registry, and the application has the names of the needed components compiled into its binary code. Because in general the application does not change as components change, to function properly, global component sharing requires that any shared component function exactly like previous other versions of that component with respect to what an application expects. In practice, however, perfect backwards compatibility is difficult if not impossible to achieve, among other reasons because it is impractical to test the many configurations in which the shared component may be used. For example, both newer and older applications end up sharing the same component, whereby over time, fixing and improving the component becomes increasingly difficult. Moreover, the practical functionality of a component is not easily defined. For example, some applications may utilize unintended side effects in a component that are not considered part of the core function of the component, e.g., an application may become dependent on a bug in a component, and when the component publisher chooses to fix that bug, the application fails. Of course, on the other side, application writers cannot test future versions of components.

As a result, problems occur when a component is updated to its newer version, such as when a new application or operating system service pack is installed with updated copies of components, as the newly installed component versions become the ones used by other applications and components on the system. The sheer volume of applications and components that rely on other components magnifies this problem, which is sometimes referred to as "DLL Hell."

One mechanism that provided sharing for some applications while enhancing the stability of other applications was provided in Microsoft Corporation's Windows® 2000 and Windows® 98, Second Edition, operating systems. In general, this mechanism provided a way for an application to be bound to a local copy of a component instead of a shared copy. However, with this solution, a component needed to be isolated per application, which resulted in multiple copies of the same component version having to be maintained on the system. Additionally global non-code data, such as COM data, was not isolated, limiting this mechanism's usefulness with COM objects.

SUMMARY OF THE INVENTION

Briefly, the present invention provides a method, system and infrastructure that allow an application to run with specified versions of components bound thereto, wherein each component (also referred to herein as an assembly, wherein an assembly is set of one or more component files which are versioned and shipped as a unit) may exist and run side-by-side on the system with other versions of the same assembly being used by other applications. To this end, the application provides a manifest to specify any desired assembly versions. An activation context is created for the application based on the manifest to map global, version independent names to a particular version maintained in an assembly cache or in the application's respective directory. In order to specify a version for an assembly, applications need not have their code rewritten, but instead can provide the application manifest, (e.g., in an XML data structure). Similarly, each assembly has an assembly manifest that specifies the versions of dependent assemblies.

In the pre-application execution phase when creating a new process, the operating system checks for an application manifest in the same file system directory as the calling executable. When an application manifest exists, the operating system checks for an activation context for the application that was built from the manifest. If the activation context does not exist (for example this is the first time application has been executed), or it exists but is not coherent with current policy, an activation context is created via the application manifest and the assembly manifests of any dependent assemblies/assemblies listed in the application manifest.

At runtime, when a program requests creation of a global object, the operating system automatically consults the activation context built from the application and assembly manifests, to locate and load the assembly version that the application wants to use. The operating system also maps any uses of this named object (such as object (e.g., Windows®) classes) to the appropriate version to allow for multiple versions of the code module to run simultaneously without interfering with each other. By its manifest and the activation context built therefrom, an application may be bound to specific assembly versions and thereby be isolated from changes made to assembly versions by other applications.

Other objects and advantages will become apparent from the following detailed description when taken in conjunction with the drawings, in which:

DETAILED DESCRIPTION

Exemplary Operating Environment

Figure 1:
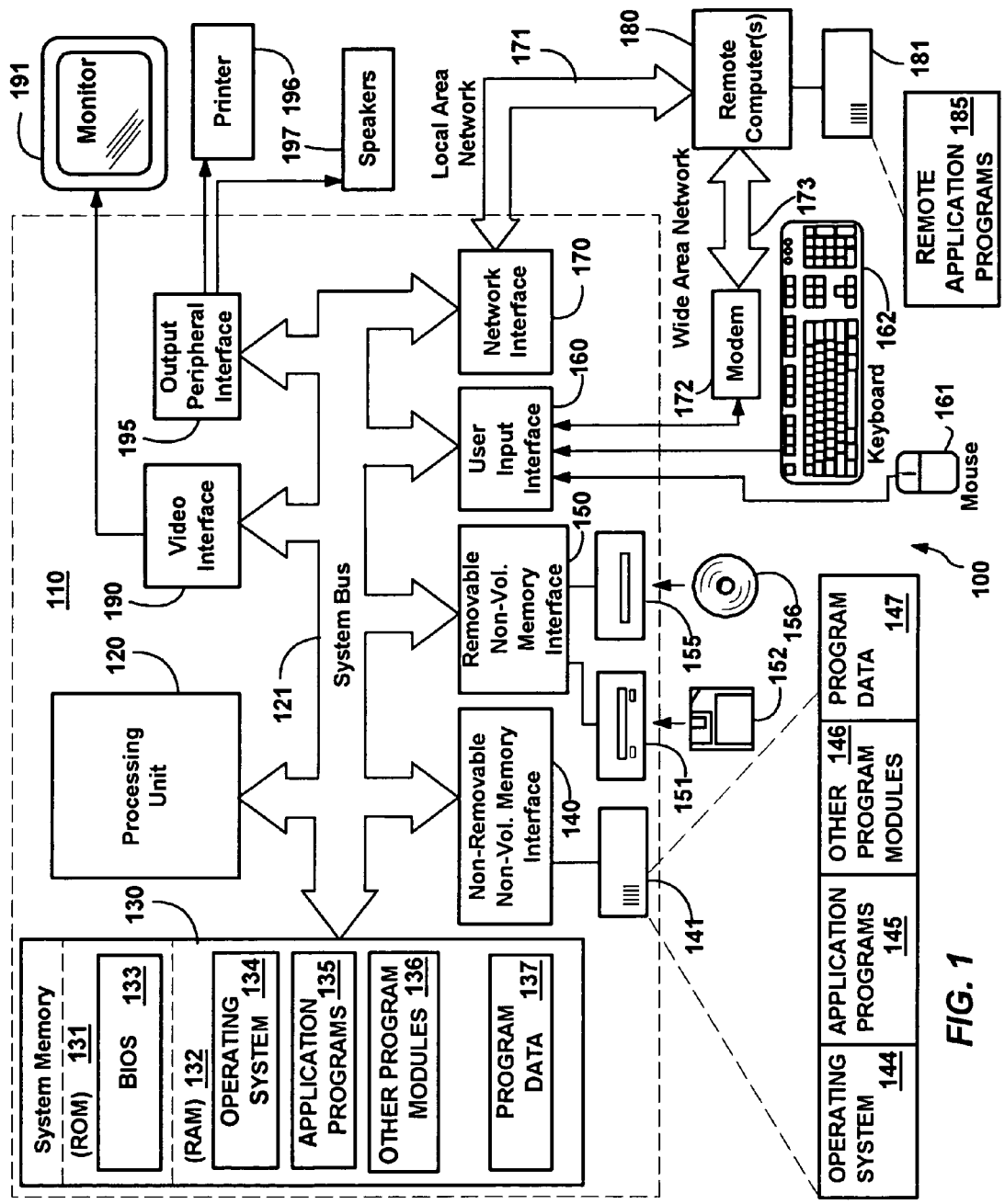
FIG. 1 is a block diagram representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Isolating and Binding Assembly Versions

The present invention is generally directed to isolating versions of components (including code and/or data) per-application program or the like, in a manner that allows multiple versions of the same component to exist and operate side-by-side on a system. For practical purposes, components may be collected into an assembly, which, when referring to items such as a component, is the lowest unit of storage packaged for activation, distribution and versioning, and isolation, as described herein. Rather than deal with individual components, of which there may be a relatively large number, many of the actions regarding components that are grouped together can be handled by referring to their assembly. For example, rather than list in the manifest $204_1$ the dependencies on a large number of individual components that are packaged together in an assembly, the manifest may simply list a dependency on the assembly. As used herein, the term "assembly" will refer to one or more components, whether referring to a single component (e.g., one contiguous DLL) or to a plurality of components grouped together.

Assemblies can be shared, such as when more than one application or the like needs an instance of the assembly's code. To provide significant flexibility while being transparent to existing and newly-developed applications, the present invention has been implemented in an operating system, with applications being run via the operating system. As will be understood, however, the present invention is not limited to applications and/or an operating system implementation, but rather is capable of being implemented by virtually any mechanism internal or external to executable code (e.g., an application) that needs or wants to use a specific version of an assembly. Note that as used herein, an application program is not limited to any particular type of software product, but includes any executable code such as operating system components, drivers and so on that in turn use other assemblies. Notwithstanding, the present invention will be primarily described with an application that uses assemblies including DLLs, resources and objects.

Figure 2:
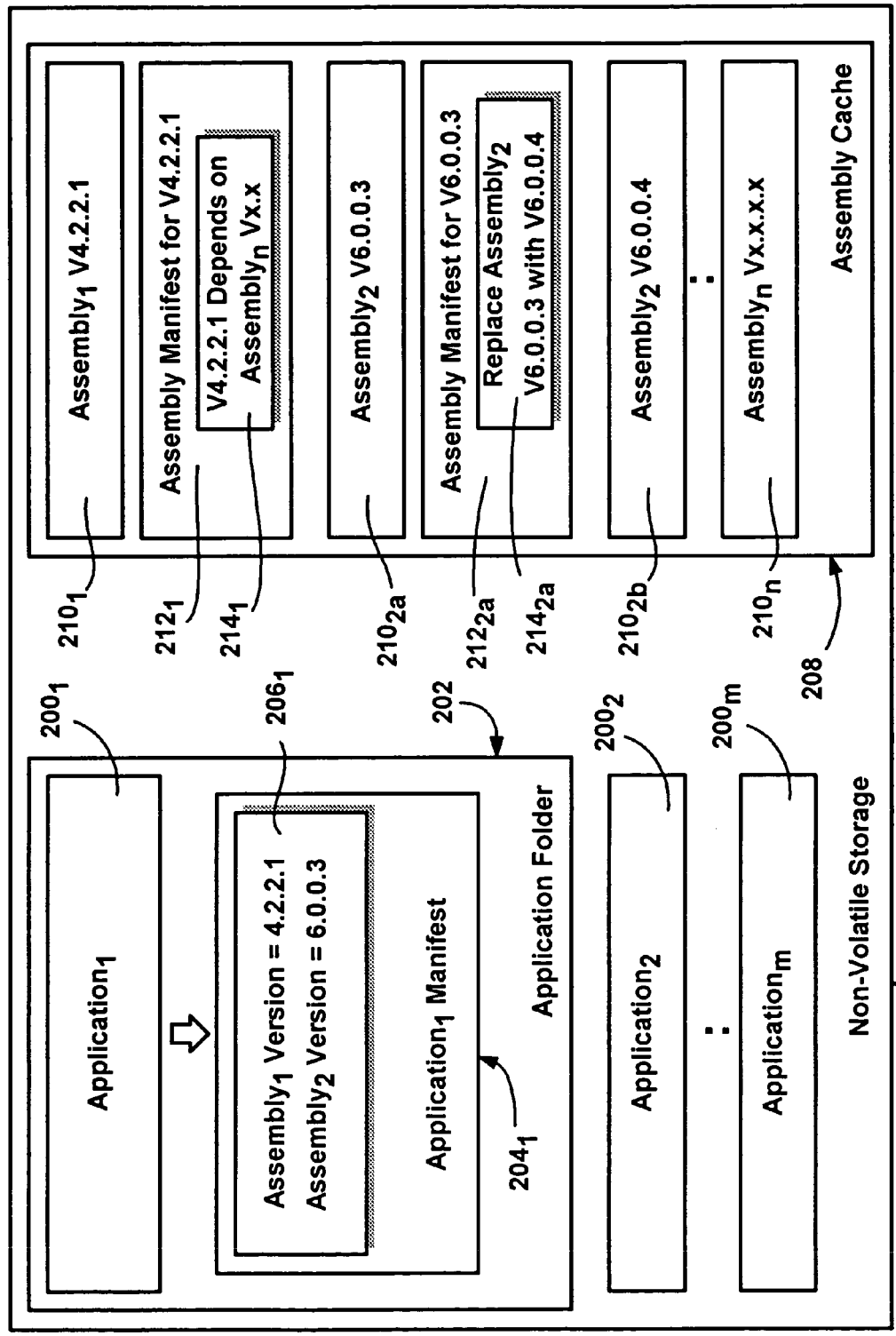
FIG. 2 is a block diagram generally representing applications and other components, including manifests that are used to specify assembly versions, in accordance with an aspect of the present invention.

FIG. 2 shows application programs (Application$_1$-Application$_m$) $200_1$-$200_m$ maintained, for example, in the non-volatile storage (e.g., hard disk drive 141) of the computer system 100 (FIG. 1). To identify specific versions of one or all of the specific assemblies the application prefers to use, an application such as the application$_1$ $200_1$ in folder 202 of FIG. 2 is associated with (or includes) an application manifest $204_1$, typically named with the same name as the application executable but with a different file extension. In general, an application manifest is an XML (extensible Markup Language) formatted file or other suitable file that comprises metadata (e.g., $206_1$) describing an application's dependencies on shareable assembly versions, (sometimes referred to as side-by-side assemblies), and also includes metadata to describe any assemblies private to the application. The application manifest may be separate from the application or may be compiled into the application's binary code/data, as long as it can be easily accessed. Note that other applications $202_1$-$202_m$ (typically in different folders) may or may not have application manifests associated therewith.

Although the application manifest lists its dependencies on assembly versions, it should be noted that technically, the application is only dependent on the manifest-specified assemblies themselves, not necessarily the exact versions that are specified. Instead, the specified versions are only those which have been tested with the application. In one implementation, another version of a needed assembly can replace the application-preferred version when additional information is available to the assembly loading mechanism (e.g., an operating system component). For example, as also described in copending U.S. patent application entitled "Configurations for Binding Software Assemblies to Applications" Ser. No. 09/842,278, assigned to the assignee of the present application, filed concurrently herewith, and hereby incorporated by reference, policy data (configurations) and/or an assembly manifest associated with the specified assembly may override the version information set forth in the application manifest. Nevertheless, it is expected that such policies and assembly manifests will be used conservatively, e.g., only for important fixes and/or after thorough testing, since they will cause replacement of the trusted assembly version.

Two types of assemblies are possible, those having strong names, e.g. including a public key signature or the like such that any two different assemblies can be unambiguously identified, and those having a simple name, which may be ambiguous in the context of an application and, for example, do not contain a public key. To provide isolation, any simply-named assemblies on which an application manifest specifies a dependency are treated as privatized. Privatized assemblies are those that the application does not intend to be shared with other applications. Privatized assemblies that have simple names are normally installed into the same folder as the executable application code, whereby the assembly is isolated and the application is given the effect of being monolithic, e.g., its assemblies are not influenced by different assemblies having the same simple name, and so forth. By not being shared, privatized assemblies with simple names thus have the benefit of virtually complete isolation, at the expense of the benefits obtained by sharing. Assemblies having strong names do not need to be placed into the application folder for isolation purposes, because assemblies with strong names are known to be the exact one the application needs. Thus, instead of being privatized by storing in a certain directory, such assemblies may be placed into a global assembly cache 212 to obtain the benefits of sharing, while effectively preserving isolation, because an application that asks for a strongly named assembly will get a copy that is exact.

Note that as represented in FIG. 2, the assembly cache 208 appears as a distinct container, however it may be a logical container, and does not have to correspond to a common folder or the like in the file system. For example, the assembly cache may comprise multiple folders to improve performance. Moreover, as long as the operating system maintains some map as to their actual location, the assemblies may be distributed among various folders of the file system, or even other file system volumes, on the same or other machines. For example, a given assembly may be maintained on a network file server. Indeed, it should be noted that any of the software files/data structures described herein may be remotely maintained and downloaded. Notwithstanding, maintaining the assembly cache in a set of one or more folders has advantages, including that a dedicated set of folders can be accessed-controlled in an efficient manner, a scattered assembly cache would have to track folder movement and so on. In any event, the assembly cache will be considered herein as a single container (e.g., comprising one or more folders) accessible by the operating system when an assembly is needed.

As further represented in FIG. 2, the application executables, application manifest $204_1$ and assemblies $210_1$-$210_n$ are maintained (e.g., as files) in non-volatile storage 141. More particularly, in one implementation, when the application $200_1$ is installed onto a computer system, the application manifest $204_1$ is copied to the application's folder (the same one that contains the application executable file), while the strongly-named assembly files (e.g., $210_1$ and $210_{2a}$) are copied to the side-by-side assembly cache 208. Note that to provide side-by-side existence of assembly versions, any existing assembly versions are not overwritten in the assembly cache 208 when another version is installed, (although a version can be removed by other means, at the risk of breaking an application that depends on that version). The assembly cache can be hidden and/or access controlled to prevent assemblies from being easily removed.

Privatized assemblies that are not strongly named are copied to the application folder, as described above. To this end, an installer or the like contacts the operating system, which then directs the installer as to where (e.g., what folder) to install any given application files or assembly files based on the manifest type, file name data (strong or simple), and/or other installation information. In this manner, any privatized assemblies with simple names are installed into the same folder as the executable application code, as described above, while sharable assemblies are stored in the assembly cache 208.

The assembly manifest is preferably copied to the assembly cache 208 with its corresponding assembly at the time of installation. The assembly manifest describes the assembly and includes information about its individual assembly, including, for example, the name and version of the assembly, the items (program files, resources) that make up the assembly, and the binding path to items within the assembly (e.g., for Win32 DLLs this is the location of the DLL relative to the root of the assembly, whereas for COM Servers this is the CLSID (class identifier), ProgID (programmatic identifier) and other COM metadata). The assembly manifest may also include any dependencies on other assemblies, object classes and global names.

Example manifests in XML format are set forth in the tables below, wherein TABLE1 is an example of a simple application manifest where the application depends on a side-by-side version of COMCTL32:

TABLE 1

```
<?xml version="1.0" encoding="UTF-8" standalone="yes"?>
<assembly xmlns="urn:schemas-microsoft-com:asm.v1"
    manifestVersion="1.0">
  <assemblyIdentity
      version="1.0.0.0"
      processorArchitecture="X86"
      name="Microsoft.Windows.mysampleApp"
      type="win32"
  />
  <description>Your app description here</description>
  <dependency>
    <dependentAssembly>
      <assembly.Identity
          type="win32"
          name="Microsoft.Windows.Common-Controls"
          version="6.0.0.0"
          processorArchitecture="X86"
          publicKeyToken="6595b64144ccf1df"
          language="*"
      />
    </dependentAssembly>
  </dependency>
</assembly>
```

TABLE2 is an example of an application manifest where the application depends on a side-by-side version of COM-CTL32 and an assembly is privatized to the application:

TABLE 2

```
<?xml version="1.0" encoding="UTF-8" standalone="yes"?>
<assembly xmlns="urn:schemas-microsoft-com:asm.v1"
manifestVersion="1.0">
<assemblyIdentity
    version="1.0.0.0"
    processorArchitecture="X86"
    name="Microsoft.Windows.mysampleApp"
    type="win32"
/>
<description>Your app description here</description>
<dependency>
    <dependentAssembly>
      <assemblyIdentity
        type="win32"
        name="Microsoft.Windows.Common-Controls"
        version="6.0.0.0"
        processorArchitecture="X86"
        publicKeyToken="6595b64144ccf1df"
        language="*"
      />
    </dependentAssembly>
</dependency>
<!-- Privatized assembly -->
<file name="mypaint.dll">
    <comClass description="Font Property Page"
clsid="{0BE35200-8F91-11CE-9DE3-00AA004BBB51}"/>
    <comClass description="Color Property Page"
clsid="{0BE35201-8F91-11CE-9DE3-00AA004BB851}"/>
    <comClass description="Picture Property Page"
clsid="{0BE35202-8F91-11CE-9DE3-00AA004BB851}"/>
</file>
<file name="mydraw.dll"/>
<file name="testctl32.dll">
    <windowClass>ToolbarWindow32</windowClass>
    <windowClass>ComboBoxEx32</windowClass>
    <windowClass>testctls_trackbar32</windowClass>
    <windowClass>testctls_updown32</windowClass>
    <windowClass>testctls_progress32</windowClass>
</file>
<file
  name="new\SxS_COM.dll">
    <comClass
      description="SxSTestObject Class"
      clsid="{F3B09421-5A10-4756-98AF-7A447E07D3C2}"
      threadingModel="Apartment"
      tlbid="{B21102B9-90DF-4841-BEAC-41F68CD94BDC}"
      progid="SxS_COM.SxS_COMObject.1">
      <progid>SxS_COM.SxS_COMObject </progid>
    </comClass>
    <interface
      iid="{D8C178A3-F275-4EAB-B6F4-896B5B9A0FC0}"
      name="ISxSTestObject"
      proxystubclsid="{00020424-0000-0000-C000-
000000000046}"
      proxystubclsid32="{00020424-0000-0000-C000-
000000000046}"
      tlbid="{B21101B9-90DF-4841-BEAC-41F68CD94BDC}"/>
    <typelib
      tlbid="{B21101B9-90DF-4841-BEAC-42F68CD94BDC}"
      version="1.0"
      description="SxS_COM 1.0 Type Library"
      helpdir="new"/>
</file>
</assembly>
```

Assemblies may be dependent on other assemblies, which in turn are dependent on other assemblies, and so on. To ensure the proper versions of dependent assemblies, one or more of the assemblies $210_1$-$210_n$ (e.g., assembly $210_1$) may have an assembly manifest $212_1$ associated therewith that provides assembly dependency data $214_1$. To this end, assembly authors that create side-by-side assemblies may also author an assembly manifest $212_1$ with each assembly, and have that assembly manifest evaluated for proper version dependencies. Note that although not separately shown in FIG. 2, it is understood that each other assembly in the assembly cache 208 may have an assembly manifest associated therewith.

A sample assembly manifest is set forth in TABLE3 below:

TABLE 3

```
<?xml version="1.0" encoding="UTF-8" standalone="yes"?>
<assembly xmlns="urn:schemas-microsoft-com:asm.v1"
manifestVersion="1.0">
    <assemblyIdentity type="win32"
name="Microsoft.Tools.VisualCPlusPlus.Runtime-Libraries"
version"6.0.0.0" processorArchitecture="x86"
publicKeyToken="6595b64144ccf1df"/>
    <file name="mfc42u.dll"
hash="3eab067f82504bf271ed38112a4ccdf46094eb5a"
hashalg="SHA1">
      <comClass description="Font Property Page"
clsid="{0BE35200-8F91-11CE-9DE3-00AA004BB851}"/>
      <comClass description="Color Property Page"
clsid="{0BE35201-8F91-11CE-9DE3-00AA004BB851}"/>
      <comClass description="Picture Property Page"
clsid="{0BE35202-8F91-11CE-9DE3-00AA004BB851}"/>
    </file>
    <file name="mfc42.dll"
hash="ac72753e5bb20446d88a48c8f0aaae769a962338"
hashalg="SHA1"/>
    <file name="atl.dll"
hash="a7312a1f6cfb46433001e0540458de60adcd5ec5"
hashalg="SHA1">
      <comClass description="Registrar Class"
clsid="{44EC053A-400F-11D0-9DCD-00A0C90391D3}"
progid="ATL.Registrar"/>
      <interface iid="{B6EA2051-048A-11D1-82B9-
00C04FB9942E}" name="IAxWinAmbientDispatch"
proxyStubClsId32="{00020424-0000-0000-C000-000000000046}"/>
      <typelib tlbid="{44EC0535-400F-11D0-9DCD-
00A0C90391D3}" version="1.0" helpdir=""/>
    </file>
    <file name="msvcrt.dll"
hash="ba62960ceb15073d2598379307aad84f3a73dfcb"
hashalg="SHA1"/>
    <file name="msvcirt.dll"
hash="84eb92153ff379c67c2727cc7f6931e011ff8121"
hashalg="SHA1"/>
    <file name="msvcp60.dll"
hash="96952787a1676e38107ab93c6a33b9bcda1c912e"
hashalg="SHA1"/>
</assembly>
```

Among other things, an assembly manifest can specify (e.g., in an XML format) an assembly's dependency on a particular version of an assembly. For example, in FIG. 2, the assembly manifest $212_1$ includes metadata that will instruct the operating system that assembly$_1$ version 4.2.2.1 has a dependency on assembly$_n$ version x.x.x.x. In addition to dependency information, an assembly manifest can contain an instruction that overrides application manifest version information, such as to specify that one version of an assembly should be used instead of another. For example, in FIG. 2, the assembly manifest $212_{2a}$ associated with the assembly $210_{2a}$ includes metadata instructing the operating system to substitute version 6.0.0.4, i.e., the assembly $210_{2b}$, whenever there is a request to use version 6.0.0.3 (the assembly $210_{2a}$). In this manner, an assembly author may override the version specified by an application manifest, or, like an application, may specify a dependency on a given assembly version.

Note that although not shown in FIG. 2, a later-installed application policy can also change an application manifest's requested assembly version such that the existing manifest does not have to be replaced or have its contents modified to allow an application to effectively change what is in its original (e.g., shipped and installed with the application code) manifest. In other words, via the application policy, the original manifest does not have to be reinstalled or modified to change a dependency. The application policy settings can also bypass an assembly manifest's version overrides, and a system policy can override any other versioning metadata. In this manner, a flexible architecture is provided in which application authors and assembly authors, as well as system administrators, may create safe, isolated applications by simply creating declarative manifests or policies that control the dependencies on shared assemblies, while enabling changes to dependencies to be made when necessary. These and additional aspects of the architecture, including methods for resolving which version will be loaded when the various manifests and policies provide different instructions, are further described in the aforementioned U.S. patent application Ser. No. 09/842,278, entitled "Configurations for Binding Software Assemblies to Applications."

In accordance with one aspect of the present invention, the metadata in an application manifest and the metadata in appropriate assembly manifests is used during the creation of an activation context for the application to provide an efficient way to load the correct version of an assembly for the corresponding application. As a result, when an application uses the side-by-side assemblies, the application code does not have to change internally to reflect the version of the assembly being used, e.g., the application simply executes its code generally rather than perform different operations each tailored to a particular assembly version. For example, in FIG. 2, for application $200_1$, the metadata $206_1$ of the application manifest $204_1$ and the metadata $214_1$ and $214_{2a}$ in assembly manifests $212_1$ and $212_{2a}$, respectively, is analyzed and used to load the correct assembly versions. Note that manifest metadata need not specify an exact version, but may alternatively specify a range of acceptable versions.

Figure 3:
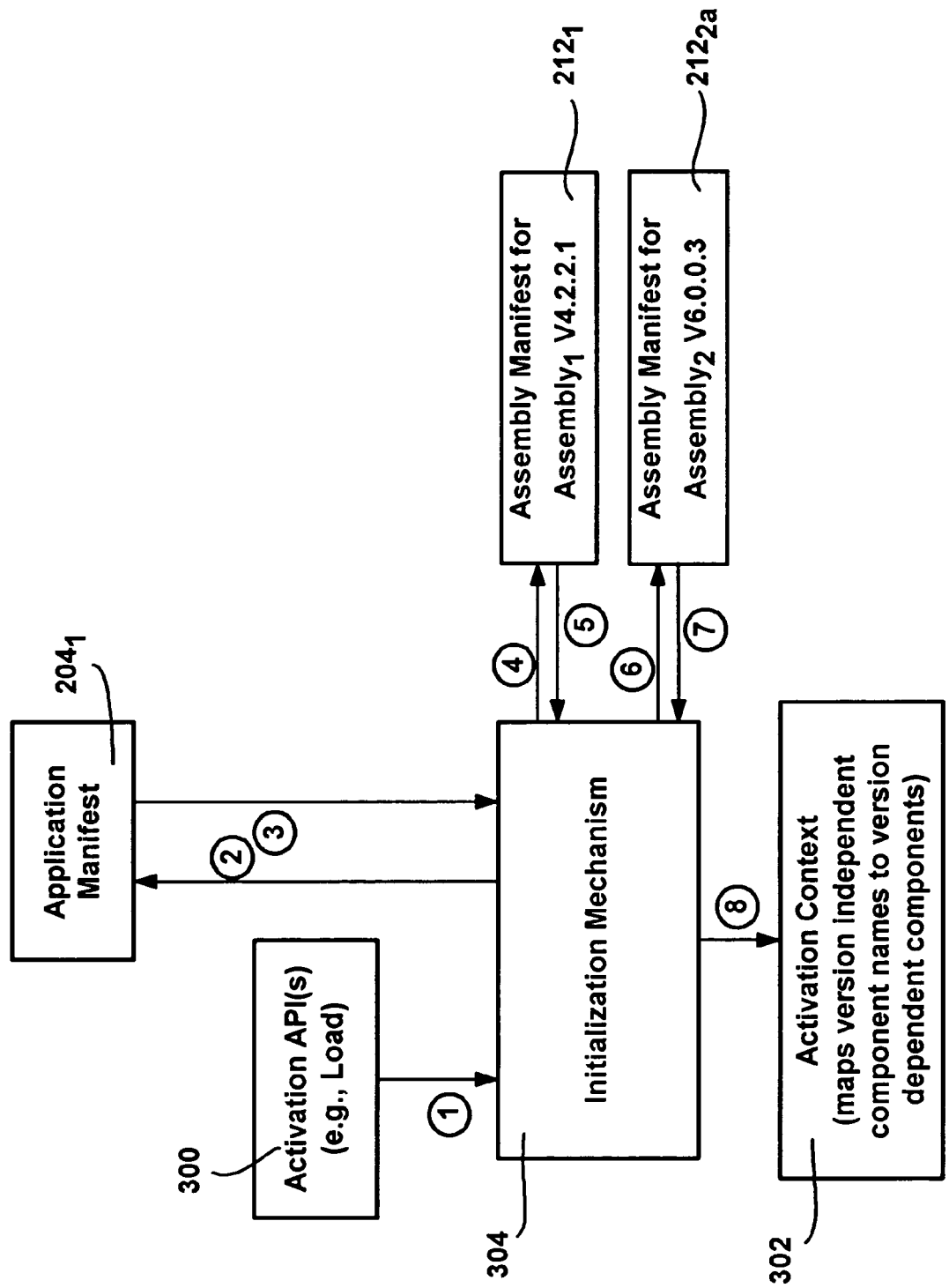
FIG. 3 is a block diagram generally representing various components for initializing an activation context to map version-independent assembly names to version-specific assemblies for an application in accordance with an aspect of the present invention.

As represented in FIG. 3, when one (or more) of a set of activation APIs (application programming interfaces) 300 are called in response to a request to run an application program, the activation APIs 300 cause a persistable activation context 302 for that program to be constructed if a valid one does not already exist for the application, (for example, when the application is being run for the first time or the activation context 302 exists but its information is invalid). To construct the activation context 302, the activation APIs call (or otherwise include) an initialization mechanism 304, wherein the call is generally represented in FIG. 3 by the arrow accompanied by the circled numeral one (1). If a new activation context 302 needs to be constructed, the initialization mechanism 304 reads and interprets the application manifest $204_1$ as represented in FIG. 2 by the arrows labeled with circled numerals two (2) and three (3). The initialization mechanism 304 also reads (circled numerals four (4) through seven (7)) and interprets the assembly manifests $212_1$ and $212_{2a}$ to obtain any dependency/override information therein. Although not separately shown in FIG. 3, if the assembly manifests specify dependencies on other assemblies, the assembly manifests of those other assemblies are read, and so on, until there are no remaining dependencies to handle. In general, the initialization mechanism 304 essentially constructs a dependency graph or other list that comprises a full set of assemblies that the application and its dependent assemblies, and their dependent assemblies, and so on, will need, and with the completed dependency graph, constructs the activation context 302 (the arrow labeled with circled numeral eight (8). In general, there is an activation context 302 for each application that has an expressed assembly dependency, and each activation context includes a mapping table preferably hashed for quick lookup.

It should be noted that not every assembly used by an application needs to be specified in the application manifest, nor does each assembly manifest have to specify all of its dependent assembly versions, only those versions wherein there is a particular version desired. This is because the architecture described herein allows a default assembly version to be used when a particular version of an assembly is not specified in a manifest. Normally, when more than one version of an assembly is available, the default assembly is the most-recent version, however it is possible for an administrator or user to set (e.g., via interaction with the operating system through a dialog box, property sheet or the like) any version as a default.

Figure 4:
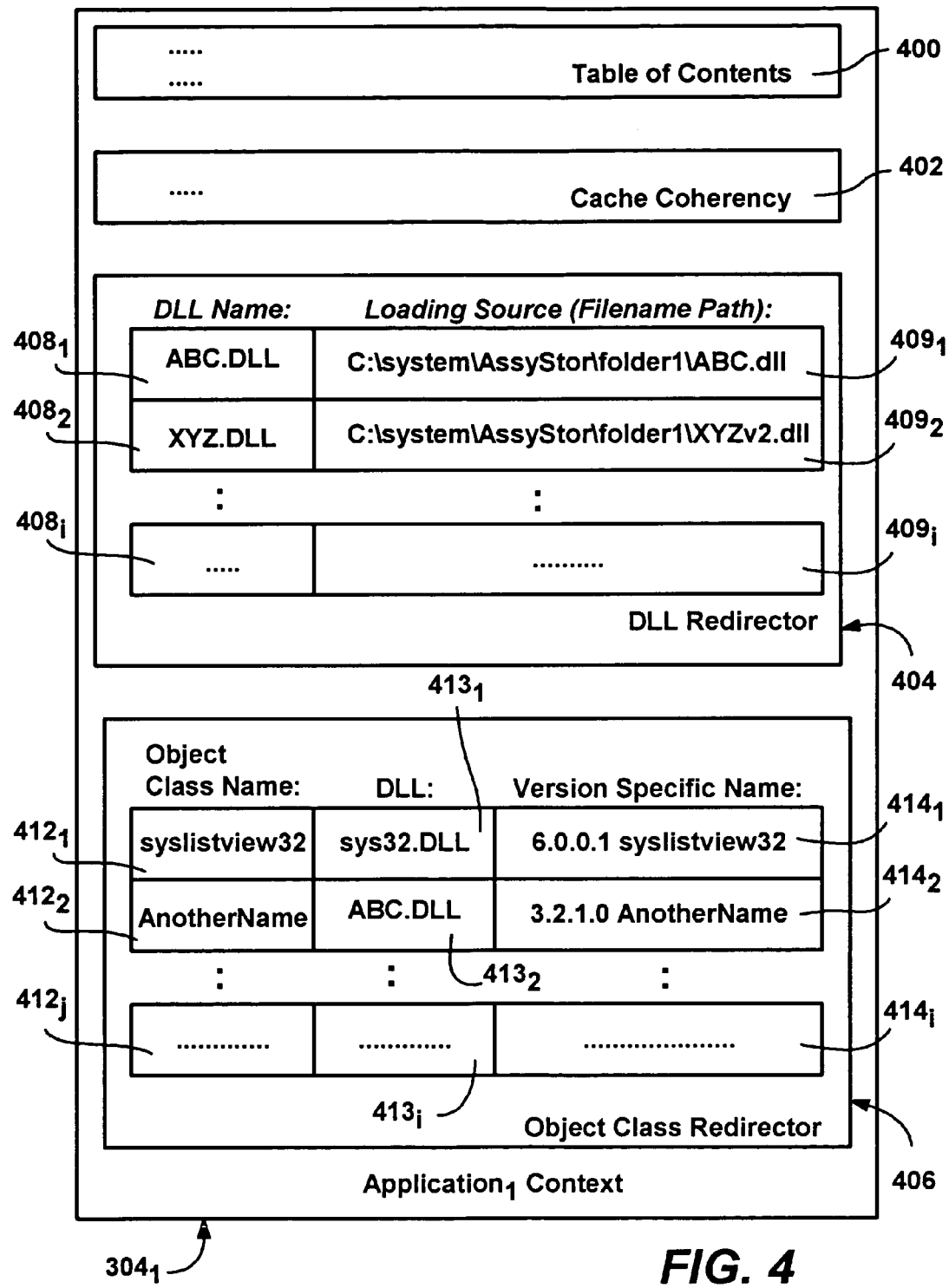
FIG. 4 is an example of information maintained within an activation context in accordance with an aspect of the present invention.

In keeping with the present invention, the activation context 302 for an application maps version-independent assemblies that are requested by an application to the versions that are specified in the application manifest and/or assembly manifests. By way of example, FIG. 4 represents some of the information that may be maintained in an activation context, e.g., an activation context $302_1$ constructed for the application $200_1$. In FIG. 4, the activation context $302_1$ includes a table of contents 400 (e.g., providing offsets to its recordsets) for rapid access to the data therein.

Once created, the activation context $302_1$ is maintained in a persistable binary form for caching. Preferably, a new activation context is recomputed each time the application is launched, and freed when the application is closed. However, in one alternative, the activation context may be preserved, e.g., to a non-volatile storage. If preserved, because policy or the like may change the dependency information therein, (e.g., a new assembly manifest has been installed), the activation context $302_1$ may include a cache coherency section 402 that is used to detect whether the saved activation context $302_1$ is valid, wherein when the activation context $302_1$ is not coherent with current policy, it is recomputed. A section per API that implements version-specific binding is maintained.

To map the application's requests to the proper assembly versions, the activation context $302_1$ includes a DLL redirector section 404 and an object class redirector section 406. The DLL redirector section 404 includes a record or the like for each DLL dependency that includes fields (e.g., $408_1$ and $409_1$) that relate the DLL name used by an application to the exact pathname of the version specified in the application manifest and/or assembly manifest. The object class redirector section 406 includes a record or the like for each object class (e.g., Windows® object class) on which an application depends, wherein each record includes fields (e.g., $412_1$, $413_1$, and $414_1$) that relate the object class name used by an application to the DLL file it is in and a version specific name. Note that the fields are arranged in a manner that optimizes lookup, e.g., the application-provided request data corresponds to the search key, and the records may be arranged in any way (e.g., alphabetically, by frequency, linearly, binary or so on) to speed searches.

Via the activation context, during runtime, an application's requests for assemblies can be efficiently satisfied with the correct version of that assembly. If a given assembly is not found in the activation context data, the default assembly is used. To summarize, when an application first runs, the activation context built from the manifest data is cached, whereby the global, version-independent named objects requested by an application are mapped to version-dependent named objects as specified in the manifest. As the application executes and requests a named object via one of the activation APIs, the version-independent named objects are applied in a version specific fashion by accessing the application context, whereby the application gets the correct version.

Figure 5:
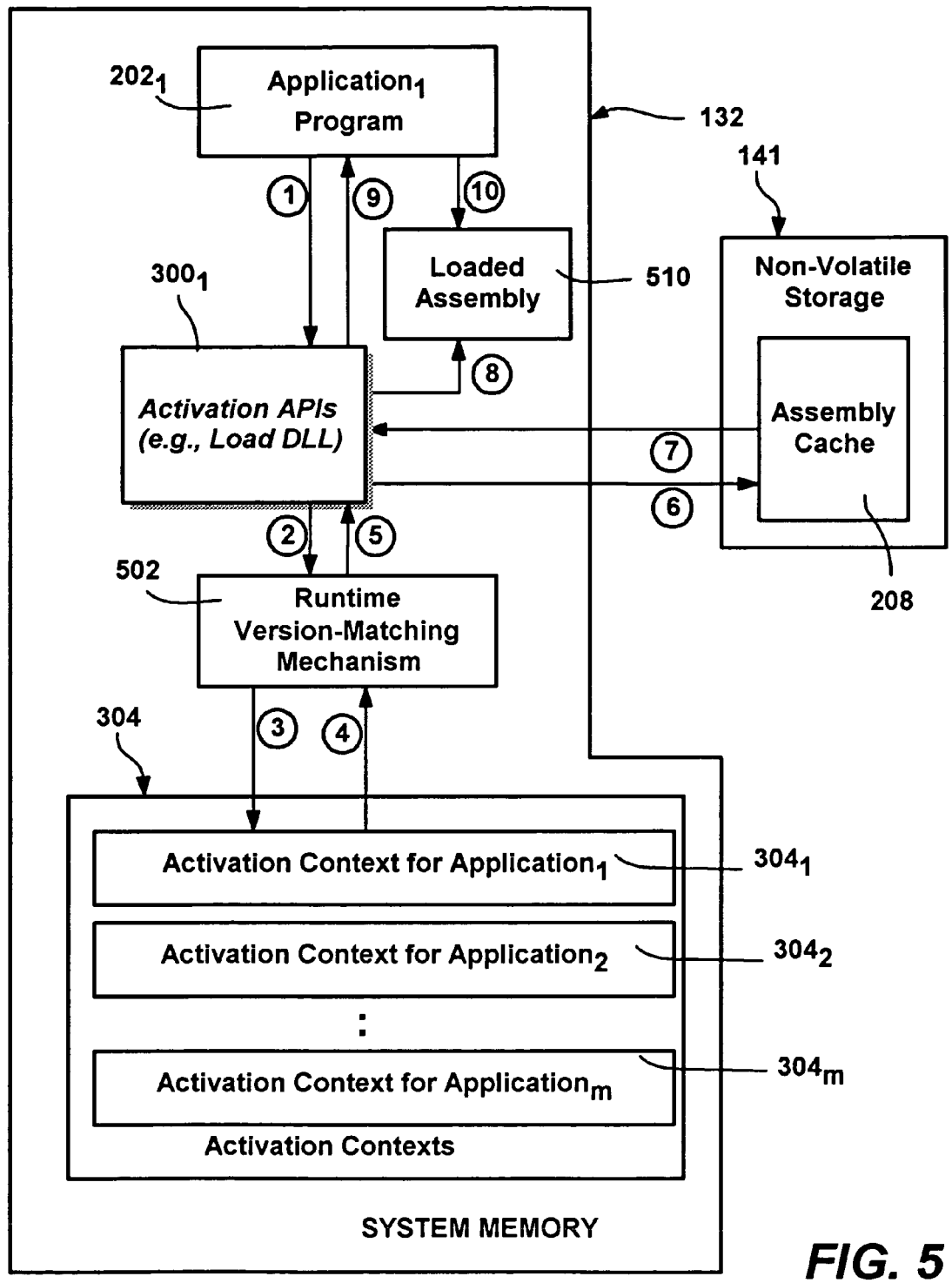
FIG. 5 is a block diagram generally representing various components for utilizing an activation context at runtime to locate and load a particular version of a requested assembly version in accordance with an aspect of the present invention.

FIG. 5 represents the general operation during runtime, wherein an application $202_1$ requests via one of a set of application APIs (e.g., $300_1$) a version-independent assembly (represented via the arrow labeled with circled numeral one (1)). Application APIS include those directed to loading DLLs, COM server loading, COM interface proxy stub metadata, type libraries for COM, program identifiers for COM, object (e.g., Windows®) classes, kernel global objects (e.g., semaphores, mutexes, events, shared memory, COM categories), application settings and database or registry connections.

When the application API $300_1$ receives the request, the request data (e.g., the application provided name) is passed to a runtime version-matching mechanism 502 (the arrow labeled two (2)). The runtime version-matching mechanism 502 locates the correct activation context $304_1$ for the calling application $202_1$, and accesses the records therein to determine the correct version of the requested assembly (the arrows labeled three (3) and four (4)). Via the tables in the activation context $304_1$, the runtime version-matching mechanism 502 will either return (e.g., as a return parameter, with the arrow labeled five (5)) the path and filename of the version-specific assembly, or a not-found status or the like (and/or the path and filename of the default file) to the activation API that called it, in which case the activation API will load the default assembly. As represented in FIG. 5 by the arrows labeled six (6) through eight (8), the activation API $300_1$ accesses the assembly cache 208 to load the correct version of the assembly. Note that alternatively, the runtime version-matching mechanism 502 may access the assembly cache 208 on behalf of the API to obtain and/or load the correct version, which is either the one listed in the records or the default version if none was found. In any event, the correct assembly version 510 is loaded and the activation API $300_1$ returns from the call to the application $202_1$, (the arrow labeled nine (9)), and the application can use the loaded assembly 510 (the arrow labeled ten (10)).

Figure 6:
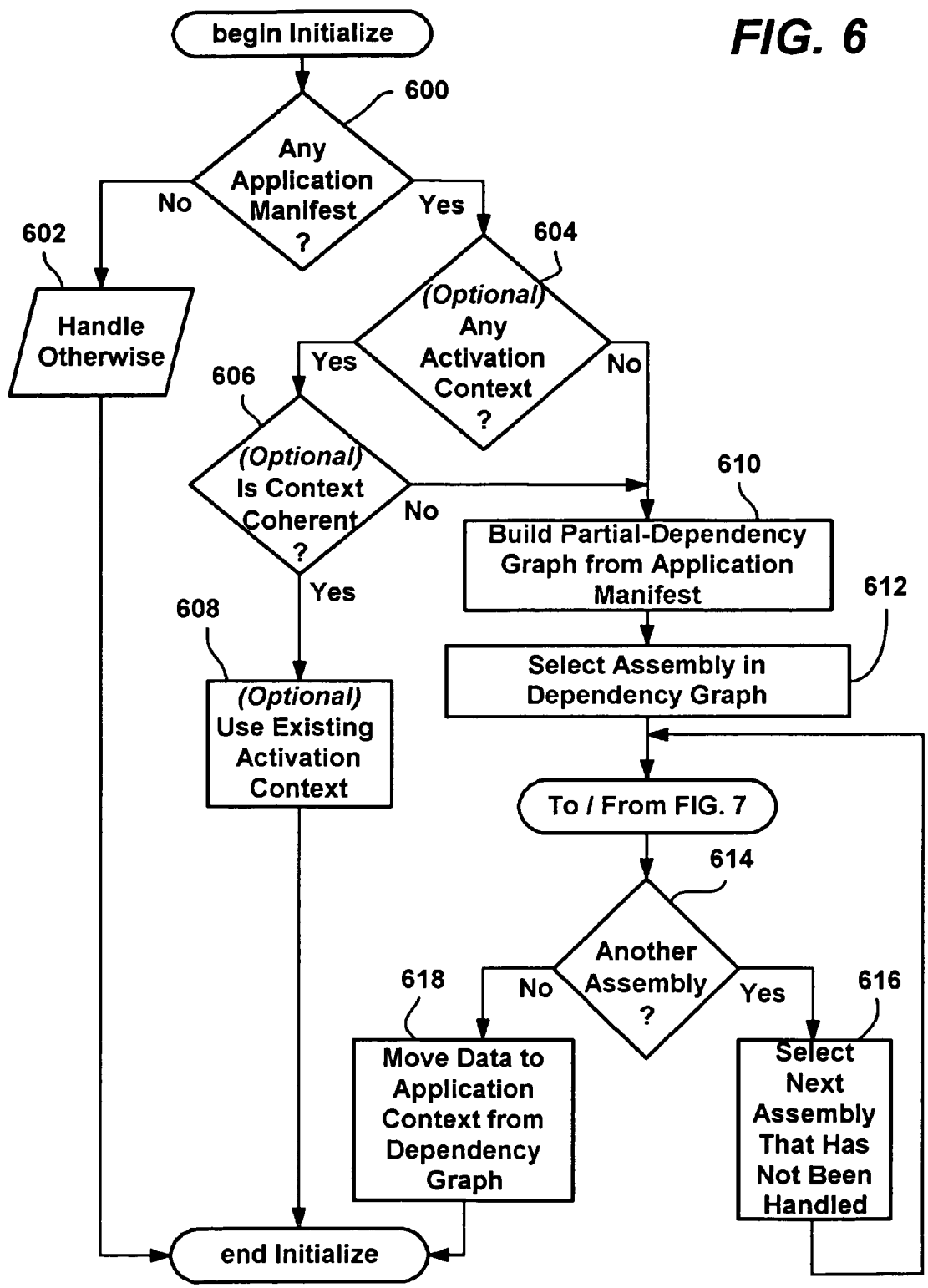
FIGS. 6 and 7 comprise a flow diagram representing general steps taken to initialize an activation context in accordance with an aspect of the present invention.
Figure 7:
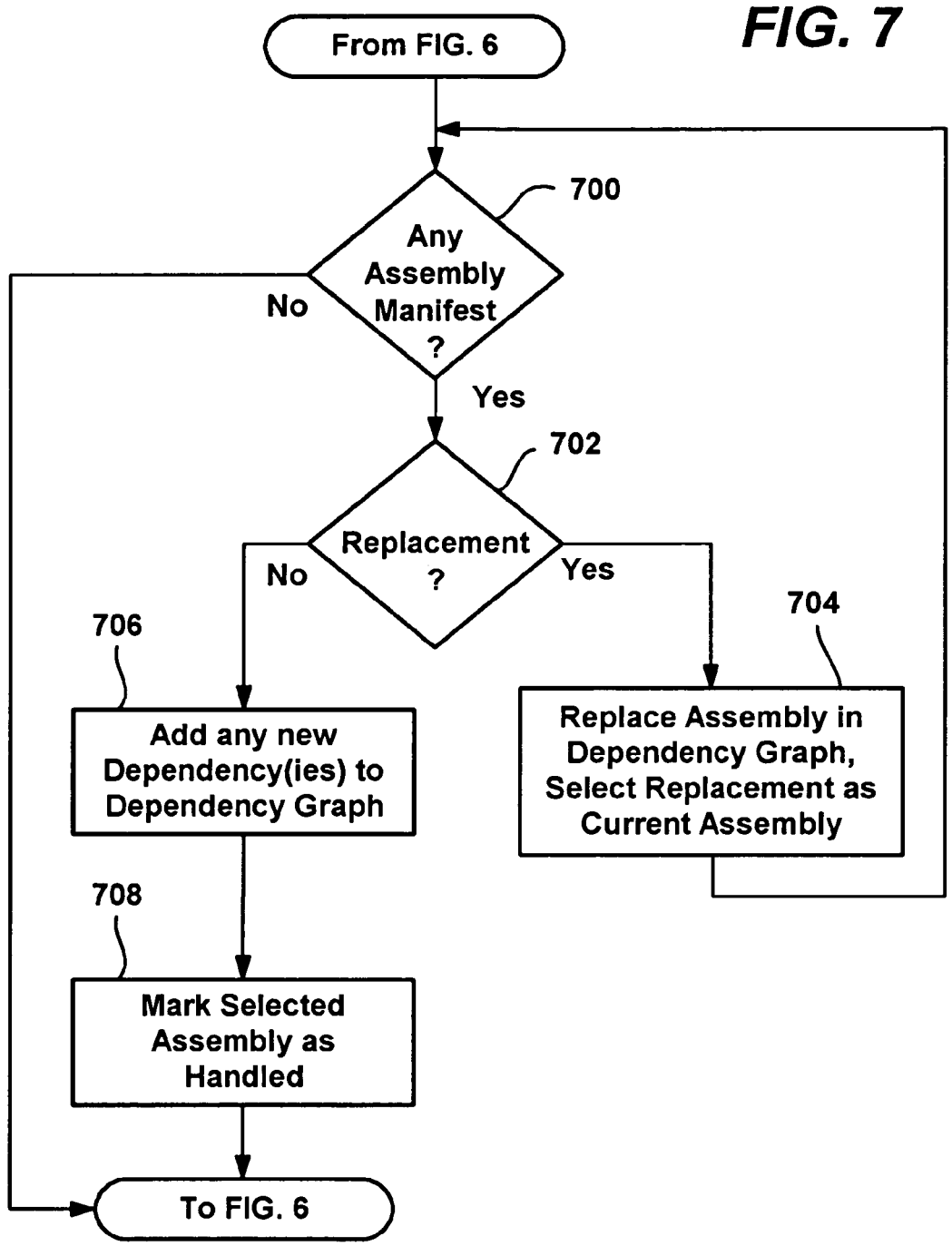
Figure 9:
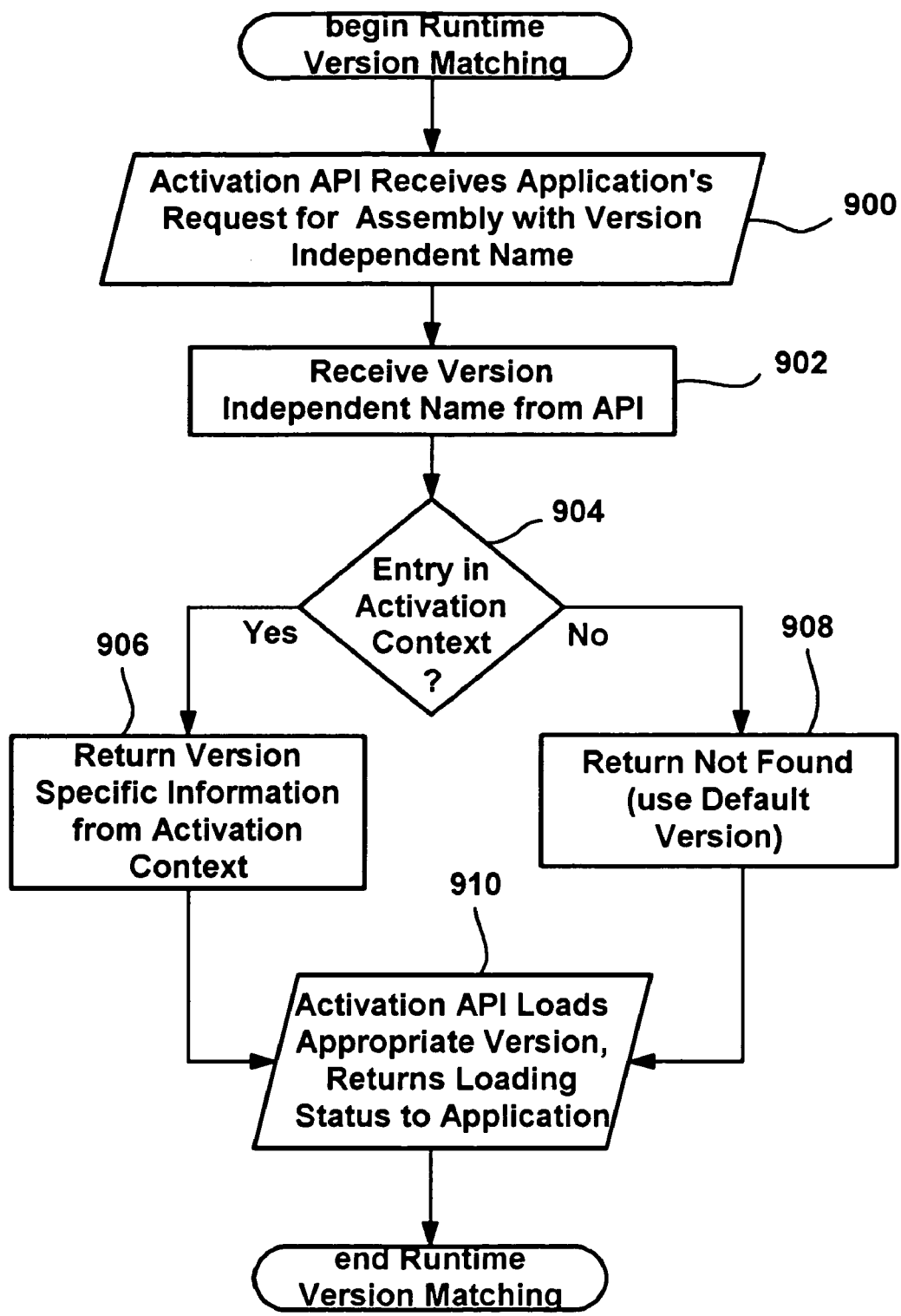
FIG. 9 is a flow diagram representing general steps taken to utilize an activation context during runtime in accordance with an aspect of the present invention.

Turning to an explanation of the operation of the present invention with particular reference to the flow diagrams of FIGS. 6, 7 and 9, as described above, the mapping of an application to a specified version of an assembly or other data structure essentially comprises two phases, an initialization phase (FIGS. 6 and 7) and a runtime phase (FIG. 9). In general, the initialization phase constructs the activation context, if needed, that maps version-independent assemblies to version-specific assemblies based on the dependencies (and other instructions) in the various manifests. Then, during a runtime phase, (FIG. 9), the activation context is accessed as needed to rapidly locate and load the appropriate versions when an application requests an assembly that it needs. Note that although it is feasible to eliminate the initialization phase by walking the various manifest data to locate the correct version on each request, such requests are frequently made during an application's runtime, and it is thus more efficient to construct the context once and thereafter access it on each request.

FIG. 6 represents exemplary steps that may be taken during initialization (pre-application execution) phase to construct the activation context, if needed. When creating a new process, the initialization mechanism 304 (e.g., of the operating system) checks for an application manifest in same file system directory as the calling executable, as represented in FIG. 6 by step 600. If an application manifest does not exist, the initialization mechanism 304 handles its absence in another manner, (step 602), e.g., it can search for it, and/or the operating system essentially will give the application default versions during runtime, such as by first loading any requested assembly from the application's own directory when one is present, and otherwise using the default assemblies from the assembly cache.

When step 600 determines that an application manifest exists, the initialization mechanism 304 (FIG. 3) preferably branches to step 610 to create the activation tables. Alternatively, if activation contexts may be preserved rather than recomputed each runtime, the initialization mechanism 304 may check for an existing activation context (e.g., 302) for the application. If an existing activation context is found, step 604 branches to step 606 to validate it, otherwise step 604 branches to step 610. Step 606 checks the activation context to determine if it is coherent with current configuration, and if so, the existing activation context 302 can be used (step 608) and the initialization process ends. If alternatively the activation context 302 is not coherent with current configuration at step 606, for example, because a more recent configuration has been provided to the system, the initialization process continues to step 610 to recompute a new activation context 302.

In the event that the initialization process continues to step 610 to create the activation context, step 610 represents obtaining the binding information from the application manifest. Steps 610, 612, 614 and 616 of FIG. 6 are executed, along with the steps of FIG. 7, essentially to walk through the various manifests in order to build up a dependency graph, replacing assembly information (nodes) as necessary in the dependency graph and adding any new nodes to include the dependencies of any assembly manifests.

Figure 8:
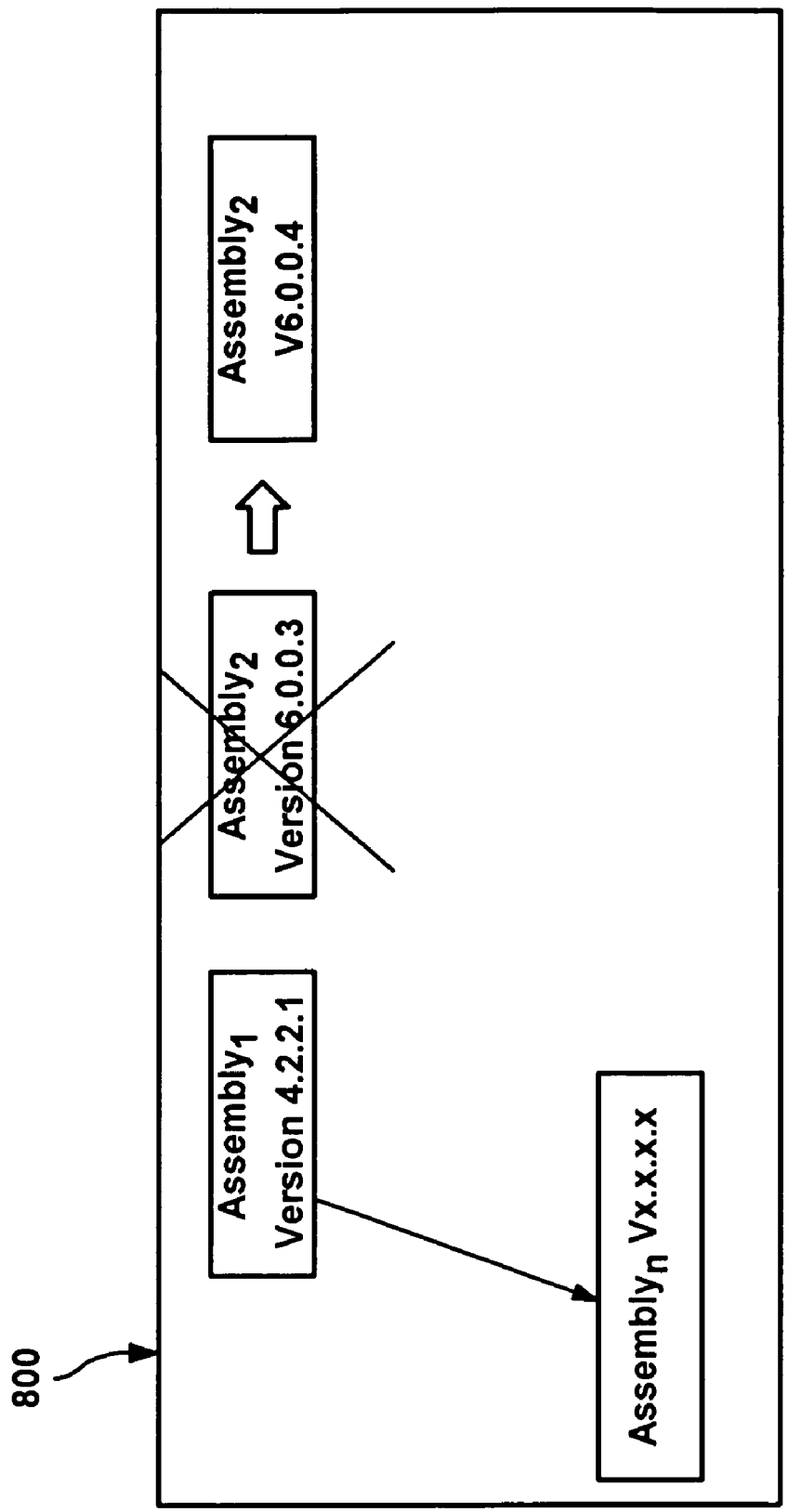
FIG. 8 is a representation of a dependency graph useful in constructing the activation context in accordance with an aspect of the present invention.

By way of example, FIG. 7 operates once the application manifest has it dependent assemblies added to the dependency graph (step 610 of FIG. 6) and an assembly (node) therein has been selected (step 612, e.g., via a top-down, left-to-right or other suitable progression). At step 700 if a selected assembly in the graph has an assembly manifest, step 700 branches to step 702, otherwise there are no dependencies or replacements to deal with for this assembly, and the process returns to FIG. 6 to handle any assemblies that have not been handled. If there is an assembly manifest, step 702 tests whether the assembly manifest includes data specifying that the assembly should be replaced with another version. If so, the new version replaces it in the dependency graph, and the process returns to step 700 to evaluate that version's assembly manifest, (if any). For example, in FIGS. 2 and 8, (wherein FIG. 8 shows a dependency graph 800 corresponding to the assemblies identified in FIG. 2), the assembly$_2$ version 6.0.0.2is replaced by the assembly manifest with version 6.0.0.3.This in turn may have an assembly manifest that causes its replacement, and so on, until an assembly manifest is found that does not specify a further replacement.

When the appropriate assembly is in the graph following any possible replacements, step 702 branches to step 706 wherein any dependencies listed in the current assembly's manifest are added to the dependency graph. For example, in FIGS. 2 and 8, the assembly$_1$ has a dependency on the assembly$_n$, whereby assembly$_n$'s information is added to the graph 800. In this manner, the correct assembly versions of those specified in the manifests will wind up in the dependency graph. Note that although not shown in FIG. 7, only dependent assemblies not already listed in the graph will have new nodes added therefor, so that each assembly is only selected and handled once, e.g., a pointer can go in the graph to an existing dependency rather than add a new node, thereby eliminating circular dependencies. The process continues to step 708 to mark the selected assembly as having been handled, before returning to FIG. 6 to select another assembly for handling, until none remain. When the assemblies have been handled at step 614, the dependency graph is used to construct the activation context at step 618, essentially by filling in the fields with the correct version information for each assembly present in the graph. Note that a simple list can be used instead of a graph, however a graph provides information about the relationships between assemblies as well as which ones are used, which can be used to construct a more efficient activation context. When constructed, the activation context is copied to the child process in the operating system data structure's defined environment process, making it the process default.

FIG. 9 shows the general steps taken to locate and load the correct version at runtime, e.g., when a program at runtime creates a global object, the system automatically gives it a version-specific named object by consulting the activation context built from the manifest. Note that FIG. 9 is intentionally streamlined for efficiency, i.e., the activation context is built in advance, so that during runtime an efficient and rapid lookup can be performed to find the appropriate version.

Beginning at step 900 the activation API receives the application request including the version-independent assembly name, not the version specific name, and passes it as a parameter or the like to the runtime version matching mechanism, where it is received at step 902. If an entry for the name is in the activation context at step 904, the runtime version matching mechanism returns the version specific information (e.g., including the path and filename of the correct version) based on the manifest at step 906. If an entry for the name is not found in the activation context at step 904, at step 908 the runtime version matching mechanism returns a not found status, (or alternatively can determine and return the path and filename of the default version). At step 910, the activation API loads appropriate version, and returns a loading status or the like. The operating system also maps any uses of this named object to the appropriate version to allow for multiple versions of the code module to run simultaneously without interfering with each other, whereby, for example COM object data is isolated per object. At this time, the correct version as specified in the manifests is loaded, even though the application's executable code did not specify any version. Indeed, by providing an associated manifest that can be stored into the application's directory, an already existing application (e.g., written and installed before the present invention) can benefit from the present invention.

By way of a further example, consider two versions of an object class container, COMCTL32 version six (v6), and COMCTL32 version seven (v7), both of which have a SysListView object class therein. When the application launches for the first time, the operating system reads the manifest and creates version-specific classes for items listed in the manifest, for example, the application manifest has listed v6 and this has not been overridden. The activation context is created and the object class created for SysListView, wherein the version number for the COMCTL32 object class container and the SysListView object class is v6, as specified in the application manifest.

When the application program is running and requests an object class, the application does so as it always has, that is, by specifying the object, SysListView, without specifying any version information. However, based on the activation context, the appropriate version name of SysListView (in this example corresponding to V6) will be automatically returned and version v6 of the object will be located. As is understood, the application developer need not modify the application in any way to get the appropriate version, but instead only needs to provide a suitable application manifest.

In this manner, instead of having a system default of a single control such as SysListView in COMCTL32 that the processes use, multiple side-by-side versions of SysListView can be available and running. Each process has the option to choose the specific version to use. Moreover, because more metadata is being maintained about the runtime, self-healing systems are possible. For example, if an application fails, the operating system may intelligently use this metadata to repair the problem.

As can be seen from the foregoing detailed description, there is provided a method, system and infrastructure to version globally named objects in the system. Application authors may create safe, isolated applications by simply creating a declarative manifest that describes dependencies on these shared objects, without needing to be concerned with coding the application to adjust to the version of the assembly being used. By the present invention, assemblies can be safely shared and applications can be more completely isolated.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. A computer-implemented method for allowing a software application to run using a specified version of one or more shared assemblies, wherein the specified version of the one or more shared assemblies used in the application is not compiled in the executable files of the application, the method comprising:

accessing a manifest, the manifest comprising a software data file including metadata describing applications' dependencies on assembly versions, the manifest being stored in non-volatile storage and being associated with an application that is configured to load specified versions of one or more assemblies upon initiation;

building an activation context based on the accessed manifest, wherein the activation context comprises a table of contents that maps global, version independent names to a specified version of at least one of the one or more assemblies that are indicated in the manifest;

loading the activation context into computer system memory in a persistable binary form to provide accelerated access to the activation context;

receiving a request from an application to load an assembly from among a plurality of assemblies located in a same directory;

consulting information in the activation context to identify a specified version of the requested assembly without referring to the received manifest, in response to receiving the request to load the assembly; and providing the specified version of the assembly for use by the application.

2. The method of claim 1, wherein the request corresponds to a request to load a privatized assembly.

3. The method of claim 1, wherein the request corresponds to a request to load a shared assembly.

4. The method of claim 3, wherein the shared assembly is maintained in an assembly cache.

5. The method of claim 1, wherein consulting information in the activation context to identify a particular version of the assembly includes searching for a mapping from a version independent name provided by the application to a version specific assembly.

6. The method of claim 5, wherein no mapping from the version independent name to a version specific assembly is present, and wherein providing the particular version of the assembly for use by the application comprises providing a default version.

7. The method of claim 1, wherein providing the particular version of the assembly comprises accessing a file corresponding to the assembly and loading the assembly into memory from the file.

8. The method of claim 1, wherein the information in the activation context includes a mapping between a version independent name provided by the application and a version specific file system path and filename of the particular version of the assembly, and wherein providing the particular version of the assembly comprises returning the path and filename to an assembly loading mechanism.

9. The method of claim 8, wherein the application is stored as an application executable file in a folder, and wherein the version of the assembly is stored as another file in the same folder.

10. The method of claim 8, wherein the filename corresponds to a file in an assembly cache.

11. The method of claim 1, wherein the information in the activation context is derived from application manifest.

12. The method of claim 11, wherein the information in the activation context is further derived from at least one assembly manifest.

13. The method of claim 1, wherein the information in the activation context is constructed during a pre-execution initialization phase.

14. The method of claim 1, wherein the information in the activation context is persisted into a non-volatile memory.

15. A computer-readable storage medium having computer-executable instructions for performing the method of claim 1.

16. A computer-implemented method for allowing a software application to run using a specified version of one or more shared assemblies, wherein the specified version of the one or more shared assemblies used in the application is not compiled in the executable files of the application, the method comprising:

accessing a manifest, the manifest comprising a software data file including metadata describing applications' dependencies on assembly versions, the manifest being stored in non-volatile storage and being associated with an application that is configured to load specified versions of one or more assemblies upon initiation building an activation context based on the accessed manifest, wherein the activation context comprises a table of contents that maps global, version independent names to a specified version of at least one of the one or more assemblies that are indicated in the manifest, the activation context identifying dependency information;

loading the activation context into computer system memory in a persistable binary form to provide accelerated access to the activation context;

receiving a request from an application to load an assembly from among a plurality of assemblies located in a same directory;

interpreting the dependency information associated with the application, the dependency information identifying at least one specified version of an assembly without referring to the received manifest, in response to the request to load the assembly; and associating with the application at least one mapping based on the dependency information, each mapping relating a version independent assembly name that the application may provide to a version specific assembly identified in the dependency information.

17. The method of claim 16, wherein the dependency information is provided in an application manifest associated with the application.

18. The method of claim 17, wherein the application manifest is associated with the application by being stored in a common folder with an application executable file that corresponds to the application.

19. The method of claim 16, wherein at least one mapping maps a version independent name to an assembly stored in a common folder with an application executable file that corresponds to the application.

20. The method of claim 16, wherein at least one mapping maps a version independent name to a shared assembly in an assembly cache.

21. The method of claim 16, wherein the dependency information provided by the application corresponds to an assembly having an assembly manifest associated therewith, and further comprising, interpreting the assembly manifest.

22. The method of claim 21, wherein the assembly manifest specifies that a particular version of an assembly be replaced with another version of that assembly.

23. The method of claim 21, wherein the assembly manifest specifies at least one particular version of another assembly on which the assembly having an assembly manifest is dependent.

24. The method of claim 16, wherein the dependency information is interpreted in response to receiving a request to execute the application.

25. The method of claim 16, wherein the at least one mapping is maintained in an activation context, and further comprising, persisting the activation context.

26. The method of claim 25, wherein associating with the application the at least one mapping comprises retrieving a persisted activation context.

27. The method of claim 25, wherein associating with the application the at least one mapping comprises constructing a new activation context.

28. The method of claim 27, wherein the new activation context is constructed upon determining that an activation context does not exist.

29. The method of claim 27, wherein the new activation context is constructed upon determining that an existing activation may not be not coherent with current policy.

30. The method of claim 16, further comprising, running the application, receiving a request from the application to load an assembly, the request including data corresponding to a version independent name of the assembly and providing a particular version of the assembly for use by the application based on a mapping therefor.

31. A computer-readable storage medium having computer-executable instructions for performing the method of claim 16.

32. A system in a computing environment, comprising:
an accessing mechanism configured to access a manifest, the manifest comprising a software data file including metadata describing applications' dependencies on assembly versions, the manifest being stored in non-volatile storage and being associated with an application that is configured to load specified versions of one or more assemblies upon initiation a building mechanism configured to build an activation context based on the accessed manifest, wherein the activation context comprises a table of contents that maps global, version independent names to a specified version of at least one of the one or more assemblies that are indicated in the manifest, the activation context identifying dependency information;

a loading mechanism configured to load the activation context into computer system memory in a persistable binary form to provide accelerated access to the activation context;

a receiving mechanism configured to receive a request from an application to load an assembly from among a plurality of assemblies located in a same directory;

an interpretation mechanism configured to interpret dependency data associated with the application, the dependency data corresponding to at least one specified assembly version on which the application depends without referring to the received manifest, in response to the request to load the assembly;

an associating mechanism configured to associate with the application at least one mapping based on the dependency information, each mapping relating a version independent assembly name that the application may provide to a version specific assembly identified in the dependency information; and a version matching mechanism configured to access the activation context to relate a version independent request from the application to a version specific assembly.

33. The system of claim 32, wherein the dependency data is included in the application manifest.

34. The system of claim 32, wherein the dependency data is included in an XML file.

35. The system of claim 32, wherein the initialization mechanism persists the activation context.

36. The system of claim 32, further comprising, an assembly loading mechanism configured to communicate with the application and the version matching mechanism to load the version specific assembly upon a request by the application to load a requested assembly, wherein the request does not include version specific data.

37. The system of claim 36, wherein the assembly loading mechanism loads the version specific assembly from an assembly cache.

38. The system of claim 32, wherein the dependency data identifies an assembly that has assembly dependency data associated therewith, the assembly dependency data corresponding to at least one other assembly version on which the assembly depends, and wherein the initialization mechanism adds information that corresponds to the assembly dependency data to the activation context.

39. A computer-readable storage medium having computer-executable modules configured to implement the system of claim 32.

* * * * *